US008321172B2

(12) United States Patent
Wagner et al.

(10) Patent No.: US 8,321,172 B2
(45) Date of Patent: Nov. 27, 2012

(54) METHOD FOR REAL TIME CAPABILITY SIMULATION OF AN AIR SYSTEM MODEL OF AN INTERNAL COMBUSTION ENGINE

(75) Inventors: Alexandre Wagner, Stuttgart (DE); Thomas Bleile, Stuttgart (DE); Slobodanka Lux, Deizisau (DE); Christian Fleck, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 52 days.

(21) Appl. No.: 12/621,916

(22) Filed: Nov. 19, 2009

(65) Prior Publication Data

US 2011/0144927 A1 Jun. 16, 2011

(30) Foreign Application Priority Data

Nov. 21, 2008 (DE) ......................... 10 2008 043 965

(51) Int. Cl.
*G06F 19/00* (2011.01)

(52) U.S. Cl. .................. 702/147; 73/114.32; 73/114.33; 73/118.02; 701/103; 701/59; 123/480

(58) Field of Classification Search .................. 702/147; 73/114.32, 114.33, 118.02; 701/70, 97, 93, 701/103, 59, 110, 108; 123/399, 352, 339.11, 123/339.12, 339.16, 354, 480
See application file for complete search history.

(56) References Cited

U.S. PATENT DOCUMENTS

| | | | | |
|---|---|---|---|---|
| 4,843,553 | A * | 6/1989 | Ohata | 701/93 |
| 5,270,935 | A * | 12/1993 | Dudek et al. | 701/99 |
| 5,293,553 | A * | 3/1994 | Dudek et al. | 701/102 |
| 5,377,112 | A * | 12/1994 | Brown et al. | 701/115 |
| 5,889,205 | A * | 3/1999 | Treinies et al. | 73/114.32 |
| 6,671,610 | B2 * | 12/2003 | Rekewitz et al. | 701/102 |
| 6,909,961 | B2 * | 6/2005 | Wild et al. | 701/114 |
| 6,920,863 | B1 * | 7/2005 | Aono et al. | 123/319 |
| 7,017,399 | B2 * | 3/2006 | Yokohata et al. | 73/114.31 |
| 7,200,486 | B2 * | 4/2007 | Tanaka et al. | 701/109 |
| 7,318,342 | B2 * | 1/2008 | Boehm et al. | 73/114.42 |
| 7,380,447 | B2 * | 6/2008 | Rollinger et al. | 73/114.32 |
| 7,415,345 | B2 * | 8/2008 | Wild | 701/103 |
| 7,418,334 | B2 * | 8/2008 | Lenz | 701/103 |
| 7,946,162 | B2 * | 5/2011 | Vennettilli et al. | 73/114.73 |
| 8,095,293 | B2 * | 1/2012 | Heinkele et al. | 701/103 |
| 2006/0193535 | A1 * | 8/2006 | Mishima et al. | 382/294 |
| 2006/0294479 | A1 * | 12/2006 | Koch | 716/4 |

* cited by examiner

*Primary Examiner* — Carol Tsai
(74) *Attorney, Agent, or Firm* — Kenyon & Kenyon LLP

(57) ABSTRACT

A method for determining at least one air system variable in an air supply system of an internal combustion engine in successive, discrete calculation steps, a differential equation being provided with respect to the air system variable based on measured and/or modeled variables, which describe conditions in the air supply system, a difference equation being formed for the quantization of the differential equation according to an implicit method, and the difference equation being solved in each discrete calculation step, in order to obtain the air system variable.

10 Claims, 4 Drawing Sheets

METHOD FOR REAL TIME CAPABILITY SIMULATION OF AN AIR SYSTEM MODEL OF AN INTERNAL COMBUSTION ENGINE

RELATED APPLICATION INFORMATION

The present application claims priority to and the benefit of German patent application no. 102008043965.7, which was filed in Germany on Nov. 21, 2008, the disclosure of which is incorporated herein by reference.

FIELD OF THE INVENTION

The present invention relates to a method for the real time capability simulation of an air system model of an internal combustion engine, particularly for determining one or more air system variables, particularly the boost pressure and the air mass flow at a position in the air system downstream from the control flap.

BACKGROUND INFORMATION

The correct determination of the boost pressure and the air mass flow in the intake manifold of an internal combustion engine at the position in the air system upstream of a control flap is of central importance in maintaining exhaust gas regulations. As a rule, an engine control for controlling the internal combustion engine uses these variables, so as to maintain the appropriate exhaust gas norms.

The boost pressure and the air mass flow are usually not measured by a sensor, but have to be calculated by a dynamic model in the engine control unit in real time. These calculations are based on the sensor variables or model variables for the pressure in the intake manifold $p_{22}$ (downstream from the control flap), that is, between the control flap and the inlet valves of the engine), the temperature of the aspirated air $T_{21}$ (upstream of the control flap), the air mass flow $\dot{m}_1$ upstream of a compressor (such as a turbocharger), the setting of the control flap POS and the stored air mass $m_{21}$ in the section of the air supply system upstream of control flap 7. The relationship is described by the following equations:

$$p_{21}(t) = g(V_{21}, m_{21}(t), T_{21}(t))$$

$$\dot{m}_2(t) = f(p_{21}(t), p_{22}(t), POS(t), T_{21}(t))$$

$$\frac{dm_{21}(t)}{dt} = \dot{m}_1(t) - \dot{m}_2(t)$$

The functions f( ) and g( ) are model functions which describe the relationship between the physical variables. This differential equation has to be quantized by the working method of the engine control unit. This gives a difference equation of the following structure:

$$p_{21}(t_\kappa)=g(V_{21},m_{21})(t_{\kappa-1}),T_{21})(t_\kappa))$$

$$\dot{m}_2(t_\kappa)=f(p_{21}(t_\kappa),p_{22}(t_\kappa),\mathrm{POS}(t_\kappa),T_{21}(t_\kappa))$$

$$m_{21}(t_\kappa)=m_{21}(t_{\kappa-1})+\Delta t\cdot(\dot{m}_1(t_\kappa)-\dot{m}_2(t_\kappa))$$

$$t_\kappa=\kappa\cdot\Delta t$$

This difference equation as algorithm for the solution of the above differential equation is obtained using the so-called explicit Euler method. The use of an explicit method has the following disadvantages particularly for the quantization of air system variables:

In certain operating ranges, this algorithm has a dynamic inaccuracy which could, under certain circumstances, also lead to instability. These dynamic inaccuracies or instabilities depend on the control flap setting and on the volume of the air system section upstream of the control flap.

The calculation has to be carried out, for this reason, using very small time steps, in order to achieve a meaningful stability range. This considerably increases the computational time requirements and ties down considerable computing capacity of the engine control unit.

The above model of the difference equations calculates a stationary pressure drop even at a fully opened control flap, which does not correspond to reality, as a rule. This leads to calculating inaccuracies, and thereby to an inaccurate determination of the boost pressure.

The temperature of the aspirated outside air is recorded digitally. If its value quantization has no sufficient solution, the inverting of the least significant bit of the digital temperature signal may lead to a noise-infested air mass signal $\dot{m}_2$. Consequently, an additional filtering of air mass signal $\dot{m}_2$ is required. This filtering impairs the achievable dynamics, so that the latter cannot be completely utilized.

It is therefore an object of the present invention to provide a method and a device for the improved real time capability determination of an air system variable, particularly of the boost pressure and/or of the air mass flow in the air supply system, which avoid the abovementioned problems.

SUMMARY OF THE INVENTION

This object may be attained by the method for real time capability simulation of an air system variable, particularly of the boost pressure and/or of the air mass flow in an air system downstream of the control flap in an internal combustion engine according to the description herein, and a computer program according to the further descriptions herein.

Further advantageous embodiments of the present invention are delineated and further described herein.

According to one aspect, a method is provided for determining at least one air system variable in an air supply system of an internal combustion engine in consecutive discrete calculation steps. In the method, a differential equation is provided with respect to the air system variable based on measured and/or modeled variables, which describe conditions in the air supply system, a difference equation being formed for the quantization of the differential equation according to an implicit method; and the difference equation being solved in each discrete calculation step, in order to obtain the air system variable.

One idea of the above method is to quantize the differential equation, given at the outset, according to an implicit method (backward method), in place of the explicit method (forward method) given at the outset. Methods for calculating a differential equation are designated as being explicit methods, which approximate the solution by time steps. That is, from variables known at one time step, the value to be calculated, that is present after the subsequent time step, is ascertained. In this connection, an explicit method means that only values of system variables are drawn upon, for the calculation of approximating values, which occur time-wise before the value to be calculated. In the implicit method of calculating, on the other hand, the value that is to be calculated is also used.

By the use of the implicit method, a different calculation sequence may thus come about, whereby it is ensured that the time-discrete implementation, or rather, calculation of the model equation is always stable, independent of the application or the operating range. In addition, the calculation carried out in the calculation steps is able to take place in larger time steps, in comparison with the related art, whereby the required calculating time in the engine control unit is reduced. Furthermore, the static and the dynamic accuracy of the calculated boost pressure and air mass upstream of the control flap has been able to be improved.

Moreover, when the difference equation is not linear, and when it is not solvable analytically, the difference equation may be approximated by an approximation model function, the approximation model function being selected so that an analytical solution of the difference equation exists.

The difference equation may include a root function whose operand is replaced by the approximation model function, the approximation model function containing a polynomial. In particular, the root function may be equivalent to a square root function whose operand has a polynomial of the second order as approximation model function. Coefficients of the polynomial may be determined by the method of least error squares or by selecting a plurality of interpolation points, in this context.

According to one specific embodiment, the differential equation is able to describe an air supply system having at least one volume (cubic content) and having at least one throttle valve.

In particular, the at least one air system variable may correspond to the boost pressure upstream of the throttle valve and/or the air mass flow into the air supply system.

According to an additional aspect, a device is provided for determining at least one air system variable in an air supply system of an internal combustion engine in successive, discrete calculation steps, which is developed to solve a difference equation in each discrete calculation step, so as to obtain the air system variable, the difference equation being formed for the quantization of a differential equation according to an implicit method; the differential equation being provided with respect to the air system variable based on measured and/or modeled variables, which describe conditions in the air supply system.

According to a further aspect, a computer program is provided which includes a program code that executes the above method when it is run on a data processing unit.

In the following, specific embodiments of the present invention are explained in greater detail with reference to the attached drawings.

DETAILED DESCRIPTION

Figure 1:
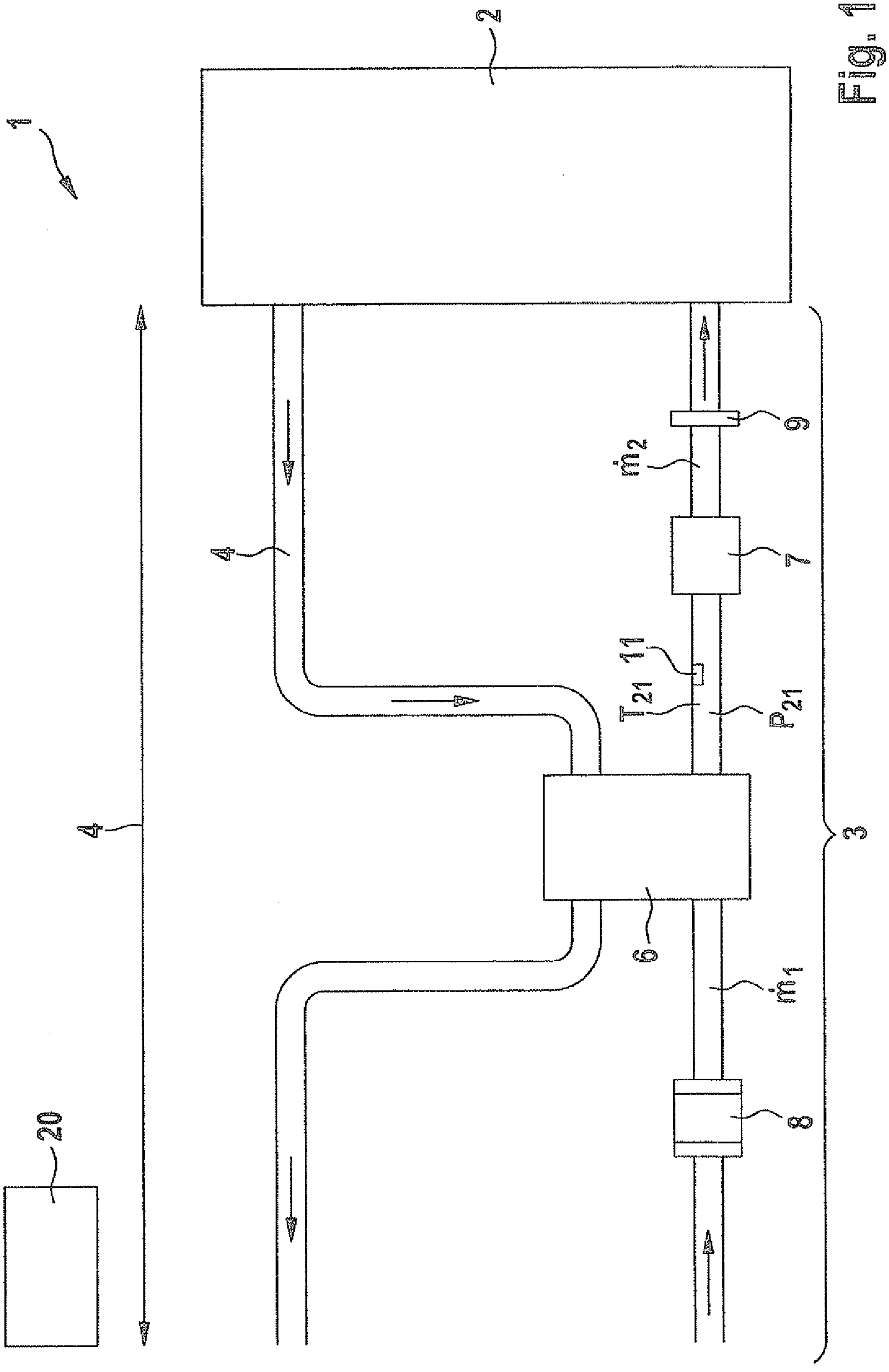
FIG. 1 shows a schematic representation of an engine system having an internal combustion engine.

FIG. 1 shows a schematic representation of an engine system 1 having an internal combustion engine 2, to which air is supplied via an air supply system 3, and from which exhaust gas is carried off via an exhaust gas removal section 4.

Air supply system 3 has a compressor 6, for instance, in the form of a supercharger driven by outflowing exhaust gas, for aspirating external air, and for applying it to a first air system section of air supply system 3. In a second air system section, which is situated upstream of compressor 6, a throttle is situated in the form of an adjustable control flap, for setting the air mass supplied to internal combustion engine 2.

Upstream of compressor 6 an air mass sensor 8 is also provided for determining the aspirated air mass flow $\dot{m}_1$. A pressure sensor 9 is provided downstream from compressor 6 in the second air system section, in order to provide a pressure of the air provided via air supply system 3 shortly before the inlet into a corresponding cylinder (not shown) of internal combustion engine 2 as measured variables.

Furthermore, a temperature sensor 11 measures temperature $T_{21}$ of the air upstream of control flap 7.

An engine control unit 20 is provided for receiving the measured variables, temperature $T_{21}$ upstream of control flap 7, air mass flow $\dot{m}_1$ upstream of compressor 6, pressure $p_{22}$ downstream from control flap 7, as measured variables, and to determine from them the corresponding boost pressure $p_{21}$ and air mass flow $\dot{m}_2$ downstream from control flap 7. These variables are required for operating internal combustion engine 2, in particular, engine control unit 20 determines the setting of control flap 7, and the injection quantity of the fuel to be injected. Here we shall not go into the exact function of the control of internal combustion engine 2 as a function of the determined boost pressure $p_{21}$ and of air mass flow $\dot{m}_2$ downstream from control flap 7.

In engine control unit 20, the differential equation given at the outset is solved for the determination of these variables, and in order to avoid the problems mentioned there, it is proposed here to quantize the differential equation with the aid of an implicit method:

$$p_{21}(t_\kappa)=g(V_{21},m_{21}(t_{\kappa-i}),T_{21}(t_{\kappa-i}))$$

$$\dot{m}_2(t_k)=f(p_{21}(t_{\kappa-i}),p_{22}(t_{\kappa-i}),\mathrm{POS}(t_{\kappa-i}),T_{21}(t_{\kappa-i}))$$

$$m_{21})(t_\kappa)=h(m_{21}(t_{\kappa-i}),\dot{m}_1(t_{\kappa-i}),\dot{m}_2(t_{\kappa-i}),\Delta t)$$

$$t_\kappa=\kappa\cdot\Delta t\ i+0\ \ldots\ k$$

where f( ), g( ), h( ) give model functions for describing the relationships between the variables, $P_{21}$ is the pressure upstream of control flap 7, $V_{21}$ is the volume upstream of control flap 7, $m_{21}$ is the air quantity or air mass of the air in volume $V_{21}$, $T_{21}$ is the temperature of the air located in volume $V_{21}$, $p_{22}$ is the pressure directly upstream of the inlet into the cylinders of the internal combustion engine, POS is the position of control flap 7, $\dot{m}_1$ is the air mass flow upstream of compressor 6, $\dot{m}_2$ is the air mass flow downstream from control flap 7 (before a possible introduction location of recirculated exhaust gas), $t_k$ is the elapsed time and $\Delta t$ is the cycle time of the calculations.

In this quantization, in contrast to the quantization mentioned in the introduction, using the implicit method for calculating current pressure $p_{21}(t_k)$, the currently stored mass in the container, $m_{21}(t_k)$ is used.

If the nonlinear equation system of the implicit method is reformed in a suitable manner, one obtains the nonlinear equation:

$$m_{21}(t_\kappa)=h(m_{21}(t_{\kappa-i}),m_1(t_{\kappa-i}),f(g(V_{21},m_{21}(t_{\kappa-i}),T_{21}(t_{\kappa-i})),\ p_{22}(t_{\kappa-i})\mathrm{POS}(t_{\kappa-i}),T_{21}(t_{\kappa-i}),\Delta t)$$

$$t_\kappa=\kappa\cdot\Delta t\ i+0\ \ldots\ k$$

Usually this nonlinear equation system is solved in each time step $t_k$. In special cases, this equation may, however, also be solved analytically. In general, iterative methods, such as the Newton method, are used to determine a solution.

Figure 2:
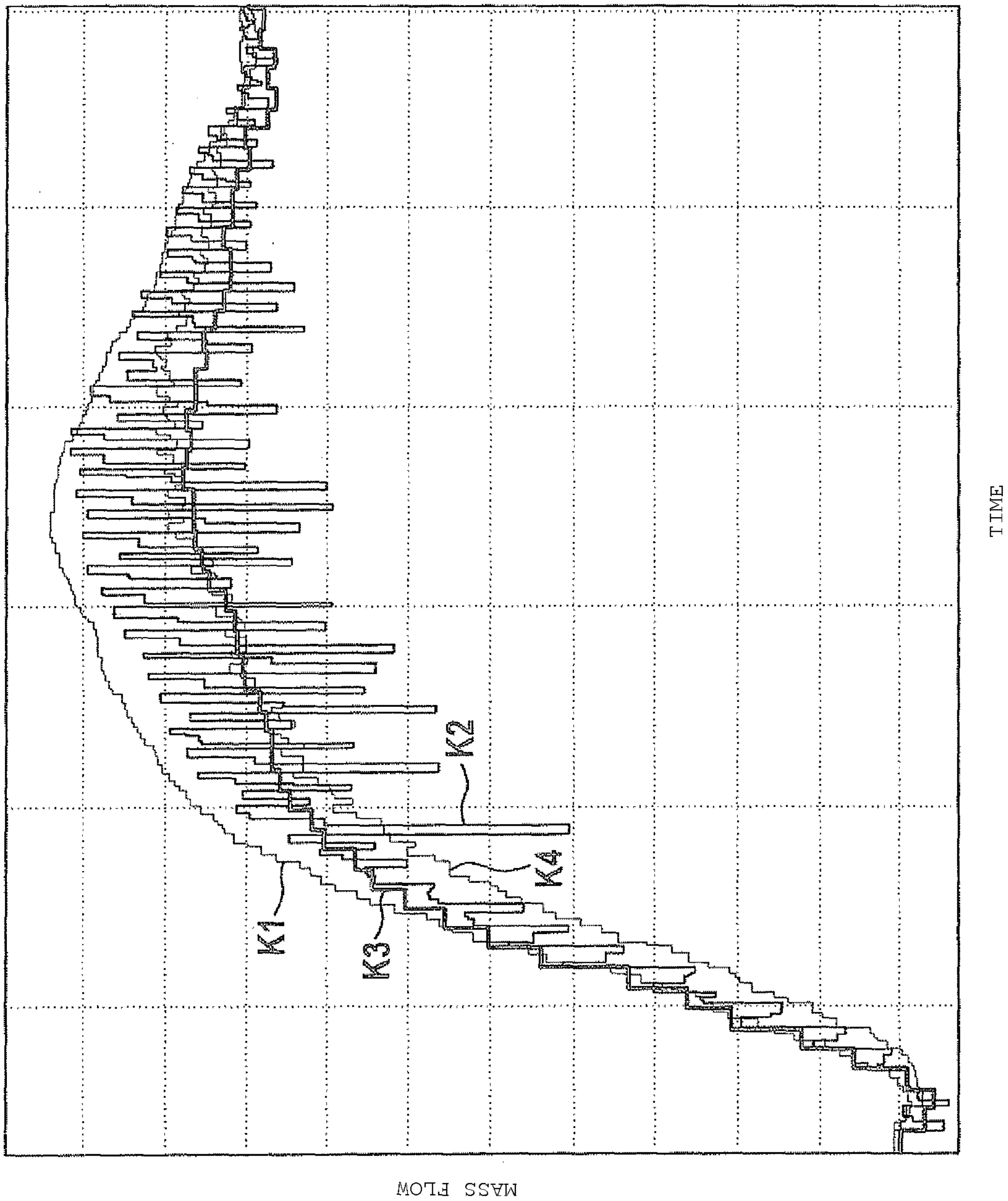
FIG. 2 shows a curve of the calculated air mass flow $\mu_Z$ downstream from the control flap in the case of various algorithms.

FIG. 2 shows a comparison of air mass flows $\mu_2$ downstream from the control flap, according to various algorithms. Curve K1 shows the measured mass flow upstream of compressor 6. From this, using various algorithms, air mass flow $\dot{m}_2$ is calculated in the first air system section downstream from control flap 7. For stability reasons, the algorithm up to now has to be calculated using a very small scanning time ΔT. In addition, calculated mass flow $\dot{m}_2$ is strongly noise-infested. The noise may be reduced by low-pass filtering. Unfortunately, the dynamics suffer from this, whereby a clear delay comes about (see curve K4). The new algorithm is calculated using a very much greater scanning time, such as a ten times greater scanning time, whereby a clear reduction in the required running time comes about (see curve K3). Low-pass filtering is not required, whereby clearly better dynamics of the signal are obtained.

Figure 3C:
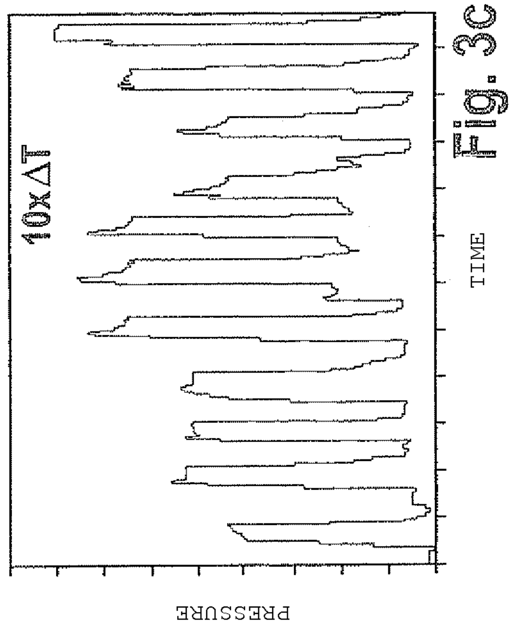
FIG. 3 shows the curves of the simulated and measured boost pressures of the explicit method and the implicit method.
Figure 3A:
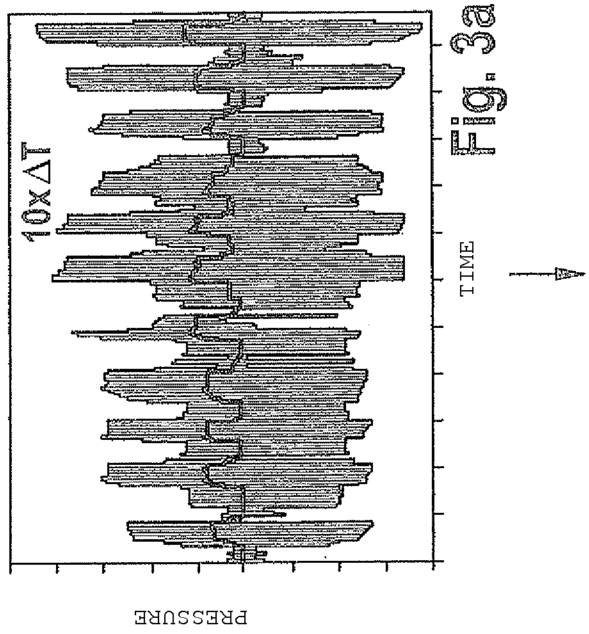
Figure 3B:
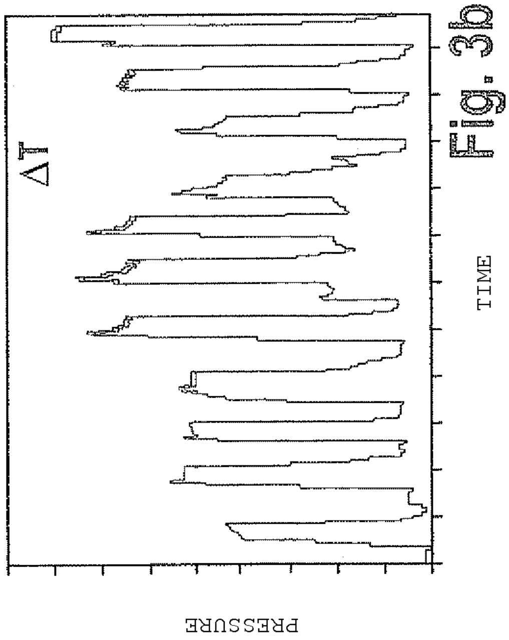

In FIGS. 3*a*, 3*b*, 3*c* a comparison is shown of the calculated and the measured boost pressures $p_{21}$. It is clearly seen that the usual algorithm according to the explicit method is unstable in response to a large scanning time of 10*ΔT (FIG. 3*a*). Using the same explicit method, if the scanning time is reduced to ΔT by a factor of 10, one obtains a stable curve, which may, however, have static deviations (FIG. 3*a*). If the explicit method is replaced by the implicit method, one obtains a stable curve, in spite of the use of a large scanning time 10*ΔT which, in addition, is statically more accurate (FIG. 3*c*).

A specific example of the comparison of the solution of the differential equation is described below, when it is solved according to explicit Euler or implicit Euler. A system is given, of the form $$T\cdot\dot{\chi}(t)+\sqrt{\chi(t)}=K\cdot u(t_\kappa),$$

which corresponds to the class of model equation given at the outset; T and K are constants and do not include any time-dependent parameters. By quantizing analogously to the algorithm according to the implicit Euler method, this yields the difference equation $$T\cdot\frac{\chi(t_\kappa)-\chi(t_{\kappa-1})}{\Delta t}+\sqrt{\chi(t_\kappa)}=K\cdot u(t_\kappa)$$

$$T\cdot\chi(t_\kappa)+\Delta t\sqrt{\chi(t_\kappa)}=K\cdot u(t_\kappa)+T\cdot\chi(t_{\kappa-1})$$

$$t_\kappa=\kappa\cdot\Delta t$$

It is seen that this quantizing according to the implicit Euler method leads to an implicit, nonlinear equation. This nonlinear equation may be solved by suitable methods in each time step $t_k$.

However, in special cases this equation can be solved analytically, which is the case in the example selected in this case. One obtains:

$$\chi(t_\kappa)=\left(\left(-\frac{\Delta t}{2\cdot T}\right)+\sqrt{\left(\frac{\Delta t}{2\cdot T}\right)^2+K\cdot\frac{\Delta t}{T}\cdot u(t_\kappa)+\chi(t_{\kappa-1})}\right)^2$$

This analytical solution is desirable, since it substantially reduces the calculating effort in the engine control unit.

A specific example of ascertaining boost pressure $p_{21}$ (pressure upstream of the throttle valve) in an air system is described below. In this context, the nonlinear equation that is yielded by the quantization of the differential equation is made analytically soluble by an approximation function of the throttle equation.

Starting from the general form of the throttle equation $$\dot{m}_2(t)=f(p_{21}(t),p_{22}(t),\mathrm{POS}(t),T_{21}(t))$$

where the function f is assumed to be $$\dot{m}_2(t)=POS(t)\cdot p_{21}(t)\cdot\sqrt{\frac{2}{R\cdot T_{21}(t)}\cdot\psi(\Pi)}$$

$$\psi(\Pi)=\begin{cases}\psi_{Krit} & 0\le\Pi<\Pi_{Krit}\\ \sqrt{i_1(\kappa)(\Pi^{i_2(\kappa)}-\Pi^{i_s\kappa})} & \Pi_{Krit}\le\Pi\le 1\end{cases}$$

$$\text{with }\Pi=\frac{p_{22}(t)}{p_{21}(t)}$$

$$\text{and with }\psi_{Krit}=\sqrt{i_1\left(\Pi_{Krit}^{i_2}-\Pi_{Krit}^{i_2}\right.}$$

This corresponds to the general throttle equation, where $p_{22}$ is the pressure downstream from the throttle valve, $p_{21}$ is the boost pressure upstream of the throttle valve and K is the adiabatic exponent with $K=c_p/c_v$ ($c_p$: specific heat capacity at constant pressure, $c_v$: specific heat capacity at constant volume) and $\Pi_{Krit}$ is a critical pressure relationship over throttle valve 7. The values $i_1$, $i_2$, $i_3$ correspond to various rational numbers which only depend on the constant K. The equation cannot be solved in an analytical manner because of the various rational exponents $i_2(\kappa)$, $i_3(\kappa)$ under the above root function.

An analytical solution for the boost pressure $p_{21}$ of the above nonlinear equation may be attained at any point in time (calculation step) by suitable approximation to the above root function, with the aid of a polynomial function in a root function. In particular, the approximation using a root function having a polynomial of the second degree, as in $$\sqrt{i_1(\kappa)(\Pi^{i2(\kappa)}-\Pi^{i2(\kappa)})}\approx\sqrt{(a\cdot\Pi^2+b\cdot\Pi=c}$$

leads to tolerable errors.

The coefficients a, b, c may be determined in a known manner by the method of least squares, by the selection of suitable interpolation points or by other approximation methods. If one substitutes the approximation function into the above throttle equation, this yields an analytical solution.

Figure 4:
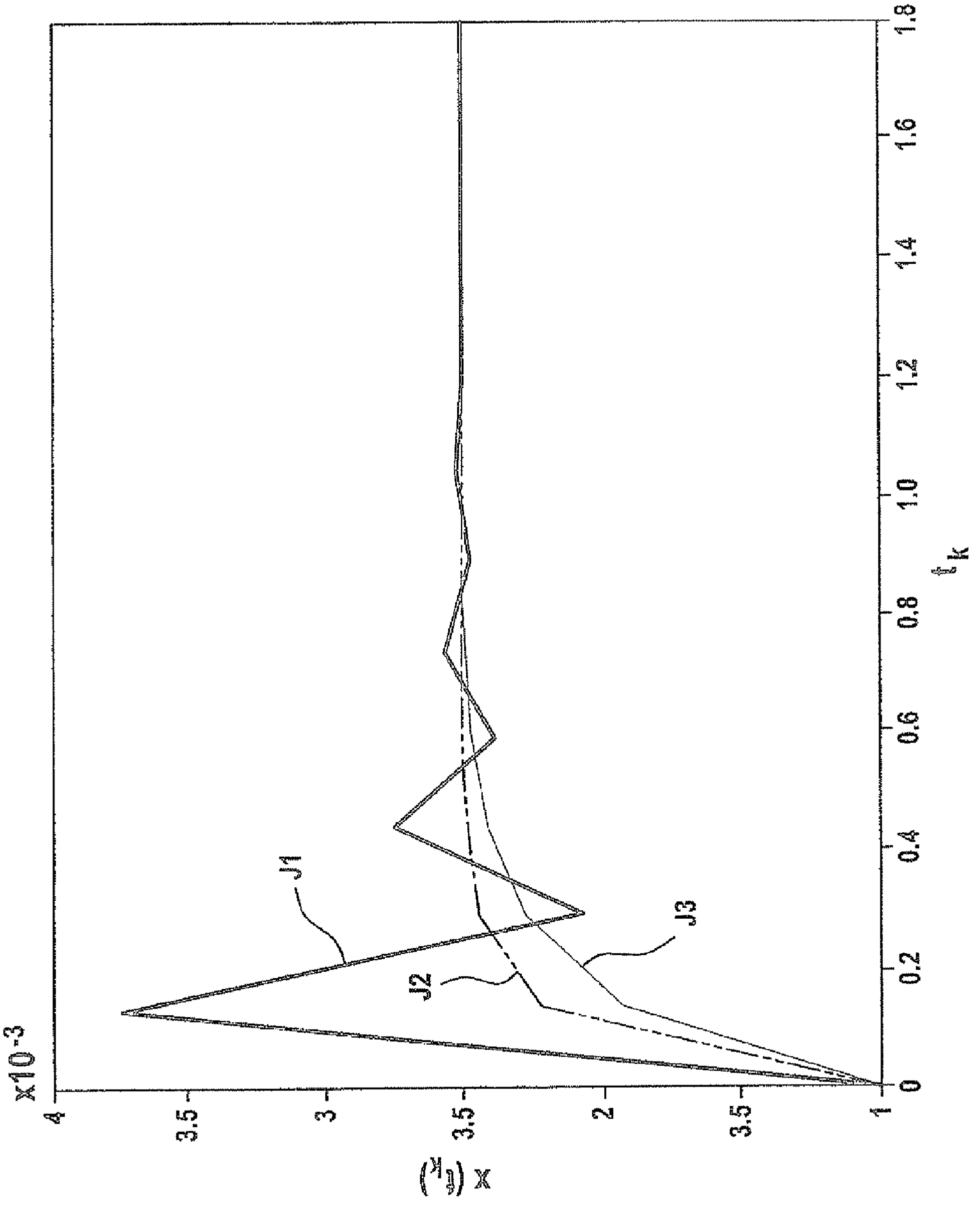
FIG. 4 shows a diagram comparing the solutions ascertained using the explicit methods as well as the implicit methods.

FIG. 4 shows a comparison of the solutions of the exemplary system, using the various methods. Curve J1 shows the curve of the solution of the nonlinear equation when solved using an explicit Euler method, J2 shows the curve of the solution of the nonlinear equation when solved using an implicit Euler method and J3 shows the curve of the genuine solution. It will be seen that the approximation according to the implicit Euler method has no oscillation and lies close to the genuine solution of the nonlinear differential equation. If the time step is increased, the solution according to the explicit Euler method even becomes unstable, whereas the solution according to the implicit Euler method remains stable. This is a great advantage when implemented in an engine control unit.

What is claimed is:

1. A method for determining at least one air system variable in an air supply system of an internal combustion engine in successive, discrete calculation steps, the method comprising:

providing a differential equation with respect to the air system variable based on at least one of a measured variable and a modeled variable, which describe conditions in the air supply system;

forming a difference equation for a quantization of the differential equation; and solving the difference equation in each discrete calculation step, so as to obtain the air system variable, wherein the difference equation is formed for the quantization of the differential equation according to an implicit method.

2. The method of claim 1, wherein the implicit method corresponds to an implicit Euler method.

3. The method of claim 1, wherein the difference equation is approximated by an approximation model function if the difference equation is nonlinear and is not solvable analytically, the approximation model function being selected so that an analytical solution of the differential equation exists.

4. The method of claim 3, wherein the difference equation includes a root function whose operand is replaced by the approximation model function, the approximation model function including a polynomial.

5. The method of claim 4, wherein the root function is equivalent to a square root function whose operand has a polynomial of the second order as an approximation model function.

6. The method of claim 4, wherein coefficients of the polynomial are determined by one of the method of least error squares and by selecting a plurality of interpolation points.

7. The method of claim 1, wherein the differential equation describes an air supply system having at least one volume and having at least one throttle valve.

8. The method of claim 7, wherein the at least one air system variable corresponds to at least one of a boost pressure upstream of the throttle valve and an air mass flow into the air supply system.

9. A device for determining at least one air system variable in an air supply system of an internal combustion engine in successive, discrete calculation steps, comprising:

a control unit configured to solve a difference equation in each discrete calculation step, so as to obtain the air system variable, wherein the difference equation is formed for a quantization of a differential equation according to an implicit method, providing the differential equation with respect to the air system variable based on at least one of a measured variable and a modeled variable, which describe conditions in the air supply system.

10. A non-transitory computer readable medium having a computer program, which is executable on a data-processing unit, comprising:

a program code arrangement having program code for determining at least one air system variable in an air supply system of an internal combustion engine in successive, discrete calculation steps, by performing the following:

providing a differential equation with respect to the air system variable based on at least one of a measured variable and a modeled variable, which describe conditions in the air supply system;

forming a difference equation for a quantization of the differential equation; and solving the difference equation in each discrete calculation step, so as to obtain the air system variable, wherein the difference equation is formed for the quantization of the differential equation according to an implicit method.

* * * * *